Patented June 22, 1954

2,681,866

UNITED STATES PATENT OFFICE 2,681,866

RESIN COATED FIBROUS MASS AND
METHOD FOR PRODUCING SAME

Alexander J. Auchterlonie, Birmingham, Mich.

No Drawing. Application March 9, 1951,
Serial No. 214,831

9 Claims. (Cl. 117—10)

This invention concerns an article made from unwoven fibers and a thermoplastic resin and, further, concerns a method of making the article.

Methods are known in the textile finishing art wherein a coating of a thermoplastic resin can be applied to the surface of a woven fabric. The resin may be colored and embossed to provide a flexible article which presents an attractive and wear-resistant surface.

A second method known to the art involves the use of either woven fabrics or unwoven masses of fibers which are impregnated with a thermoplastic resin in hot molds to form so-called laminates. This latter method produces rigid and solid board-like products and even in relatively thin sections cannot be used where any degree of flexibility is required.

In some uses; for example, in constructing insulating walls; the first described method is used to produce a coated fabric as the outside layer of the wall and the fabric is in turn backed up by a layer of insulating fibers such as jute, fiber glass, wool, etc. In this manner sound deadening walls have been constructed in automobiles between the motor and the car interior by packing jute between the metal body wall and a fabric wherein the latter is coated with a suitable resin on the side facing the car interior. In such uses the resin provides a durable surface with esthetic appeal while the jute or like material serves as an insulator. Despite the recognition in the art of the valuable, economical advantages to be gained by the use of inexpensive fibrous materials as the major proportion of any such wall thickness and using the coated, relatively expensive woven fabric as a minor proportion of such wall thickness no one has yet provided for the very desirable objective of eliminating the woven fabric entirely.

It is an object of this invention to provide an article comprising a porous open structure of unwoven fibers of substantial thickness and presenting at least one tough, abrasion resistant thermoplastic resin surface, such article being characterized by the absence of woven material.

It is a further object to provide a method for preparing such an article.

I have now found that the foregoing and related objects can be secured in an article which comprises a mass of unwoven fibers and a thermo plastic resin wherein said resin is disposed principally at a surface of said fiber mass and in the space between the fibers which lie adjacent said surface and wherein the said fibers are bound together by said resin.

The method of the invention generally comprises applying a thermoplastic resin to at least one side of a layer of unwoven fiber, such as jute and the like, of substantially uniform thickness; heating the resin to its fusion temperature; applying a pressure to said fused resin to press part of it into the open spaces between the fibers lying adjacent to the coated surface, and returning said resin to room temperature. In preferred embodiments of the invention and prior to the step of heating the resin to its fusion temperature the resin is maintained at an elevated temperature below its fusion temperature for a period of time sufficient to free the resin of substantially all volatile materials which may be present.

In another preferred embodiment the surface of the resin is embossed while at its fusion temperature. Other preferred embodiments provide for dividing the actual coating step into several sequences and, in particular, provide for a step in which a limited proportion of the resin is applied to the fibrous mass; that is, a proportion sufficient to cause a binding of the fibers but insufficient to provide a resin layer of any substantial thickness. In the latter method the surface layer of suitable thickness is applied in a separate step or steps.

An example of one detailed method of procedure is as follows:

An emulsion of a thermoplastic polymer consisting of a suitably plasticized and emulsified copolymer of 92% polyvinyl chloride and 8% polyvinyl acetate as the resinous constituent is sprayed on the surface of a jute layer supported on a conveyor belt, the coating including 3 dry ounces per square yard. The coated jute is then passed through a chamber heated to a temperature below the fusion temperature of the resin, the temperature depending somewhat on the plasticizing substances present and their proportions. The resin is maintained at this temperature until substantially all volatile materials have been removed and the resin layer consists of a tough continuous film.

The coated jute is next passed through a zone heated to a temperature at which the resin fuses. The fusion temperature likewise will vary depending on the degree of plasticizing but is generally in the range of 325°–400° F. The coated jute, while still at the fusion temperature of the resin, is passed between rolls which press the latter into the open spaces near the surface of the jute. These rolls may have a suitable design on their surface in order to emboss the surface of the resin while the latter is being pressed into the jute. Alternatively, the resin, while still in the fused state, may be passed through one set of rolls to press it into the fiber mass and a second set of rolls for the embossing step. In this manner embossing may be carried out at a low pressure which in itself is a considerable advantage of the method of the invention. Following the embossing step the resin-treated jute article may be cooled and suitably wound into compact rolls.

The nature of the fibrous material is not critical to the invention and may be jute, glass, wool, cotton, or other vegetable or mineral fibers, the fiber chosen depending principally on the use to which the product of the invention is to be put. As previously pointed out, jute is a very economical material and has been found satisfactory in a wide variety of applications. The invention also contemplates the use of mixed fibers. For example, jute may be punched with cotton fiber to form a porous mass adapted to be treated with resin according to the invention. In some instances it may be desirable to pretreat the fiber material to remove sizing material, volatile constituents, and incompatible oils. Similarly, in some cases it has been found desirable to heat the fiber to the highest temperature which is to be used in the method of the invention to permit all potential physical or chemical changes to take place in the fiber before the resin is applied.

As indicated previously, it is among the objects of this invention to completely eliminate woven materials from the articles produced from fibrous materials and thermoplastic resins in order to secure a maximum porosity of the resin bonded fibers. This, however, does not extend to punched fibers. In the use of punched fibers porosity of the final structure is not significantly affected while ease of handling is improved. Similarly, the use of punched fibers makes possible the building up of relatively thicker fiber masses. It is believed that the latter advantage stems from the fact that a transverse punching tends to position a larger number of fibers or parts thereof transverse to the coated surface of the article. It will be apparent that a greater mass of fibers can be bound when a greater proportion of them lie normal to the resin film as compared to lying parallel to the resin film. In any event, however, the major proportion of the total surface areas of the individual fibers is resin-free.

The particular resin chosen is not critical except that it be a thermoplastic resin. Again the choice to be made in any particular case depends on the use to which the article of invention is to be put, most applications requiring a surface which can take considerable wear and abrasion. The polyvinyl resins have been found most suitable for this particular use and, in particular, copolymers of polyvinyl chloride form an excellent fiber bond and present a tough, hard wearing surface. Similarly, the resin may be plasticized to any degree desired to obtain either relatively hard surfaces or relatively soft surfaces.

It is preferred that the resin be sprayed on or spread on to the fiber mass in a fluid form. The resin has been applied in solution in volatile solvents, as an emulsion particularly in paste form, as a colloidal solution, and also as a free flowing powder. In this connection the word fluid refers to the flow characteristics of colloidal, emulsified, liquid, or solid forms of the resin rather than to the particular phase of the resin used. The resin used may also be applied in the form of a thermoplastic resin film which is positioned on a surface of the fiber mass, heated to its fusion temperature, and pressed into the mass.

It is preferred that the heating steps of the invention be carried out with a gradual increase in temperature in order to prevent discontinuities such as blistering of the resin. Where minor proportions of volatile materials are used or where no volatile materials are used, it is possible to heat the resin directly to the fusion temperature since most of the volatiles, when present, will be lost while the resin is attaining the fusion temperature. The heat may be furnished by either radiation or convection from standard heat units but additional advantage can be obtained by high frequency heating. The latter method is particularly valuable for use with fibers which are inflammable at the temperatures contemplated; that is, temperatures of about 400° F.

The thickness of the coating can be varied at will and may be controlled by changing either the speed of movement of the fiber mass or the rate at which the resin is sprayed or spread on the fibers. About 0.5 to 6 dry ounces of resin per square yard of fiber mass is suitable for most uses. The depth to which the fused resin is pressed into the fiber mass is easily controlled by altering the pressure of the rolls, it being necessary only that sufficient resin be used to completely coat the surface and to penetrate the fibrous mass sufficiently deep to bond the individual fibers.

It is preferred that a slight tension be applied to the fiber layer while the fused resin is being pressed into the surface thereof. This is best accomplished by revolving the winding roll at a speed sufficient to draw the fibers slightly as they pass through the pressing rolls and the embossing rolls. In this connection, and as indicated previously, it may be desirable to use a two step process in which a small amount of resin is applied in the first, or sizing, step to provide some binding force for the fibers and to control the depth of penetration of resin in the second step. Increased thicknesses of coating can then be added in subsequent steps with a suitable tension on the coated fibers.

The invention provides an article which includes a porous fibrous mass wherein the fibers are bonded at one or both surfaces of the mass leaving a substantial body of porous uncoated or resin-free fibers. In this manner only a minor proportion of the total surface area of the fibers themselves are coated with resin. For example, extremely flexible sheets have been prepared wherein the fiber-resin volume was about 10 percent of the total fiber volume, the balance being an uncoated porous fibrous mass. Less flexible sheets, but having the advantage of increased toughness, have been prepared wherein the fiber-resin volume was about 50% of the total fiber volume. In some instances, particularly where a relatively thick layer of jute or other fiber is required, it is advantageous to form the article of the invention and then add an additional layer of fiber by the use of a suitable adhesive. In this manner also several units can be bonded together sandwich fashion where each unit is the article of the invention as defined.

Thus my new coated fibrous article finds use as an insulator or in any use which requires a flexible resilient article having esthetic appeal and a tough surface. The article is particularly valuable in automobiles to provide sound insulation and as a lining for trunk compartments and the like.

Similarly, the article of the invention has many uses where both sides of the fiber layer are coated to form an article consisting of outer layers of resin separated by a porous fiber mass of substantial thickness. In this manner relatively thick walled yet flexible articles can be made which have been found especially suitable in wearing apparel such as jackets, boots, etc.

I claim:

1. An article which comprises a mass of unwoven fibers and a thermoplastic resin wherein said resin is disposed at an outer surface of the fibrous mass and in the spaces between the fibers which lie adjacent said surface and bonds the fibers adjacent to the surface into a soft resilient article, the said resin being present in an amount between about .5 ounce and 6 ounces of dry resin per square yard of surface area.

2. An article which comprises a mass of unwoven fibers and a polyvinyl resin wherein said resin bonds said fibers and is disposed at an outer surface of the fibrous mass and in the spaces between the fibers which lie adjacent said surface, the said resin being present in an amount between about .5 ounce and 6 ounces of dry resin per square yard of surface area.

3. An article which comprises a mass of unwoven jute fibers and a polyvinyl resin wherein said resin bonds said jute and is disposed at an outer surface of the jute mass and in the spaces between the jute fibers which lie adjacent said surface, said polyvinyl resin being present in an amount sufficient to bond together the fibers adjacent to the surface and wherein the proportion of fibers coated with resin is between about 10% and 50% of the total fiber volume.

4. An article which comprises a mass of unwoven fibers and a copolymer of polyvinyl chloride wherein said copolymer is disposed at the outer surfaces of said fibrous mass and in the spaces between the fibers which lie adjacent said surfaces, said copolymer being present in an amount sufficient to bond together the fibers adjacent to the surface, and wherein the proportion of fibers coated with resin is between about 10% and 50% of the total fiber volume.

5. The method which comprises applying a thermoplastic resin, which in its polymerized form is soft and resilient at room temperature, in fluid form to one side of a layer of unwoven fibers in sufficient quantity to bond together the fibers adjacent to the surface of said layer; maintaining said resin at an elevated temperature below its fusion temperature for a period of time sufficient to free said resin of volatile material; heating said resin to its fusion temperature; applying a pressure on said fused resin sufficient to press part of said resin into the open spaces of said fiber layer lying adjacent the coated surface, the resin coated fibers of said fiber layer constituting between about 10% and 50% of the total fiber volume; and returning said resin to room temperature.

6. The method which comprises applying a polyvinyl resin in fluid form to one side of a layer of unwoven fibers in sufficient quantity to bond together the fibers adjacent to the surface of said layer; maintaining said resin at an elevated temperature below its fusion temperature for a period of time sufficient to free said resin of volatile material; heating said resin to its fusion temperature; applying a slight tension to the fiber layer and applying a pressure on said fused resin sufficient to press part of said resin into the open spaces of said fiber layer lying adjacent the coated surface, the resin coated fibers of said fiber layer constituting between about 10% and 50% of the total fiber volume; and returning said resin to room temperature.

7. The method which comprises applying a polyvinyl resin in fluid form to one side of a layer of unwoven jute in sufficient quantity to bind together the fibers adjacent to the surface of said layer; maintaining said resin at an elevated temperature below its fusion temperature for a period of time sufficient to free said resin of volatile material; heating said resin to its fusion temperature; applying a pressure on said fused resin sufficient to press part of said resin into the open spaces of said jute layer lying adjacent the coated surface, the resin coated fibers of said fiber layer constituting between about 10% and 50% of the total fiber volume; and returning said resin to room temperature.

8. The method which comprises applying a limited amount of thermoplastic resin, which in its polymerized form is soft and resilient at room temperature, to at least one side of a layer of unwoven fibers wherein said limited amount of resin is sufficient to bond the fibers but insufficient to form any substantial surface layer following the subsequent pressing step; heating said resin to its fusion temperature; applying a pressure on said resin sufficient to press it into the open spaces of said fiber layer adjacent to the coated surface; lowering the temperature of said resin below its fusion temperature; applying a second quantity of thermoplastic resin to the same side of the fiber layer; heating said resin to its fusion temperature; applying a slight tension to the fiber layer and applying a pressure on said resin; and returning said resin to room temperature, the said resin being present in an amount between about .5 ounce and 6 ounces of dry resin per square yard of surface area.

9. The method which comprises applying a thermoplastic resin, which in its polymerized form is soft and resilient at room temperature, to both outer surfaces of a layer of unwoven fibers in sufficient quantity to bond together the fibers adjacent to the surface of said layer; heating said resin to its fusion temperature; applying a pressure on said fused resin sufficient to press part of said resin into the open spaces of said fiber layer adjacent the coating surfaces, the resin coated fibers of said fiber layer constituting between about 10% and 50% of the total fiber volume; and returning said resin to room temperature.

References Cited in the file of this patent

UNITED STATES PATENTS

| Number | Name | Date |
|---|---|---|
| 2,267,316 | Thompson et al. | Dec. 23, 1941 |
| 2,314,162 | Reinhardt | Mar. 16, 1943 |
| 2,416,232 | Soday | Feb. 18, 1947 |
| 2,431,745 | Flanagan | Dec. 2, 1947 |
| 2,541,868 | Gordon | Feb. 13, 1951 |